United States Patent
Kinsey et al.

(10) Patent No.: US 11,989,722 B2
(45) Date of Patent: May 21, 2024

(54) OMNIBUS ADDRESS GENERATION AND AUTOCONVERSION OF CRYPTOCURRENCY

(71) Applicant: Coinbase, Inc., San Francisco, CA (US)

(72) Inventors: Dustin Kinsey, Poulsbo, WA (US); Jason Li, Jersey City, NJ (US); Jim Cai, Newark, CA (US)

(73) Assignee: Coinbase, Inc., San Francisco, CA (US)

( * ) Notice: Subject to any disclaimer, the term of this patent is extended or adjusted under 35 U.S.C. 154(b) by 236 days.

(21) Appl. No.: 17/502,419

(22) Filed: Oct. 15, 2021

(65) Prior Publication Data

US 2023/0119912 A1   Apr. 20, 2023

(51) Int. Cl.
*G06Q 20/38* (2012.01)
*G06Q 20/08* (2012.01)
(Continued)

(52) U.S. Cl.
CPC ....... *G06Q 20/381* (2013.01); *G06Q 20/0855* (2013.01); *G06Q 40/02* (2013.01); *G06Q 40/04* (2013.01)

(58) Field of Classification Search
None
See application file for complete search history.

(56) References Cited

U.S. PATENT DOCUMENTS

| | | | |
|---|---|---|---|
| 10,108,938 B1 * | 10/2018 | Brock | G06Q 20/20 |
| 2010/0138347 A1 * | 6/2010 | Chen | G06Q 20/10 |
| | | | 455/466 |

(Continued)

FOREIGN PATENT DOCUMENTS

| | | | | |
|---|---|---|---|---|
| WO | WO-2017080752 A1 * | 5/2017 | | G06Q 20/06 |
| WO | WO-2022175822 A1 * | 8/2022 | | G06Q 20/02 |
| WO | 2022212248 A1 | 10/2022 | | |

OTHER PUBLICATIONS

"Why you should always generate new Bitcoin addresses" by Liam Frost located at URL https://decrypt.co/17589/why-you-should-always-generate-new-bitcoin-addresses in the online publication Decrypt dated Jan. 24, 2020 (Year: 2020).*

(Continued)

*Primary Examiner* — Abhishek Vyas
*Assistant Examiner* — Blane A Lickteig
(74) *Attorney, Agent, or Firm* — Banner & Witcoff, Ltd.

(57) ABSTRACT

Aspects of the disclosure relate to event processing. A computing platform may prefetch, prior to receipt of a purchase request, a plurality of pay to addresses (associated with an omnibus account, used to route funds from the omnibus account to a merchant account, and not associated with a particular merchant account when prefetched). The computing platform may receive, from a client, a request to make a purchase from a merchant, and may associate the client and the merchant with one of the prefetched pay to addresses/notify the client of the prefetched pay to address. The computing platform may monitor the prefetched pay to address for receipt of a predefined amount of cryptocurrency associated with the purchase. Upon detecting receipt of the predefined amount of cryptocurrency, the computing platform may transfer funds corresponding to the purchase from the omnibus account to an account for the merchant.

18 Claims, 8 Drawing Sheets

(51) Int. Cl.
   *G06Q 40/02* (2023.01)
   *G06Q 40/04* (2012.01)

(56) References Cited

U.S. PATENT DOCUMENTS

| | | | |
|---|---|---|---|
| 2019/0012660 | A1 | 1/2019 | Masters |
| 2019/0356489 | A1* | 11/2019 | Palanisamy ......... H04L 63/0876 |
| 2020/0394620 | A1 | 12/2020 | Kim et al. |
| 2021/0304197 | A1 | 9/2021 | Pomassl et al. |
| 2022/0253813 | A1* | 8/2022 | Pospieszalski ........... H04L 9/50 |

OTHER PUBLICATIONS

Dec. 16, 2022—(WO) International Search Report and Written Opinion—App PCT/US2022/076628.

"Quotas related to queues" https://docs.aws.amazon.com/AWSSimpleQueueService/latest/SQSDeveloperGuide/quotas-queues.html AWS website visited Oct. 15, 2021, pp. 1-2.

"Data types" Redis https://redis.io/topics/data-types website visited Oct. 15, 2021, pp. 1-4.

"Welcome" Coinbase https://docs.cloud.coinbase.com/exchange/docs/welcome website visited Oct. 15, 2021, p. 1.

"Use cases" Cadence https://cadenceworkflow.io/docs/use-cases/ website visited Oct. 15, 2021, pp. 1-2.

\* cited by examiner

405

Fund Settlement Notification

Congratulations – your purchase is confirmed, and the corresponding funds have settled!

Fund Settlement Notification

The payment for this purchase has been executed. The funds should now be available in your account

FIG. 5 ations, payments may be routed through an intermediary, and the pay to addresses may be used to route funds from the intermediaries account to an account of the given merchant. In some instances, it may be time consuming to generate these addresses, which may result in processing errors (and/or otherwise result in failed processing), as addresses might not be available for use (e.g., they might not be generated in a timely manner).

OMNIBUS ADDRESS GENERATION AND AUTOCONVERSION OF CRYPTOCURRENCY

FIELD

Aspects described herein generally relate to cryptocurrencies and processing of custodial transactions. More specifically, one or more aspects described herein provide improvements in address generation, monetization, and autoconversion for custodial transactions involving cryptocurrency.

BACKGROUND

In some cases, to process custodial transactions, once a purchase request is received, pay to addresses may be generated on a merchant by merchant basis. In such transactions, payments may be routed through an intermediary, and the pay to addresses may be used to route funds from the intermediaries account to an account of the given merchant. In some instances, it may be time consuming to generate these addresses, which may result in processing errors (and/or otherwise result in failed processing), as addresses might not be available for use (e.g., they might not be generated in a timely manner).

Furthermore, in some instances, the intermediary may procure a fee for their services. It may be difficult, however, in some instances, to recoup the fee once a buyer's funds have been moved from the intermediary's account into an account for the merchant. This may result in delayed payments and/or other processing inefficiencies for the intermediary. Additionally or alternative, in some instance, it might not be possible for the intermediary to recoup this fee once the buyer's funds have been moved from the intermediary's account into the merchant account due to minimum cryptocurrency transaction limits dictated by fees and/or processing costs of a relevant blockchain system.

In some instances, one or more cryptocurrencies may be used by a buyer to satisfy a payment. This may result in further processing deficiencies, as, in some instances, merchants and customers may have different payment preferences. For example, while a customer may prefer to pay using one or more cryptocurrencies, the merchant may prefer to receive fiat currency. Accordingly, to accommodate such preferences, the intermediary may convert received funds (from a customer) into a different type of currency (preferred by the merchant). This may similarly be time consuming, result in volatile payment amounts for the merchants, and/or raise security concerns for merchants. As a result, there may be processing delays and/or shortcomings associated with the purchase and sale of custodial products, especially when involving the use of cryptocurrencies, which may lead to poor customer and/or merchant satisfaction.

SUMMARY

Aspects of the disclosure provide effective, efficient, scalable, and convenient technical solutions that address and overcome the technical problems associated with cryptocurrency transaction processing. In accordance with one or more embodiments of the disclosure, a computing platform comprising at least one processor, a communication interface, and memory storing computer-readable instructions may prefetch, prior to receipt of a purchase request, a plurality of pay to addresses that are associated with an omnibus account and may be used to route funds from the omnibus account to a merchant account, where the pay to addresses are not associated with a particular merchant account at the time they are prefetched. The computing platform may receive, from a client, a request to make a purchase from a merchant. The computing platform may associate the client and the merchant with one of the plurality of prefetched pay to addresses. The computing platform may notify the client of the one of the plurality of prefetched pay to addresses. The computing platform may monitor the one of the plurality of prefetched pay to addresses for receipt of a predefined amount of cryptocurrency associated with the purchase. Upon detecting receipt of the predefined amount of cryptocurrency, the computing platform may transfer funds corresponding to the purchase from the omnibus account to an account associated with the merchant.

In one or more instances, the computing platform may enroll the merchant in an omnibus event processing service corresponding to the omnibus account, which may include identifying whether or not autoconversion should be performed for the merchant.

In one or more examples, based on identifying that autoconversion should be performed for the merchant, the computing platform may convert, prior to transferring the funds to the account associated with the merchant, the predefined amount of cryptocurrency to an equivalent amount of a fiat currency, which may include transferring the equivalent amount of the fiat currency.

In one or more examples, performing the autoconversion may include: 1) identifying, prior to expiration of a predetermined time duration, the equivalent amount of the fiat currency; 2) transferring the equivalent amount of the fiat currency from the omnibus account into the account associated with the merchant; 3) trading, on behalf of the omnibus account, the predefined amount of cryptocurrency for the equivalent amount of the fiat currency; and 4) replenishing an amount of stored fiat currency using the equivalent amount of the fiat currency.

In one or more instances, enrolling the merchant in the omnibus event processing service may include identifying whether or not a fee should be collected from the merchant on behalf of an enterprise organization affiliated with the computing platform. In one or more instances, based on identifying that the fee should be collected from the merchant, the computing platform may remove, from the predefined amount of cryptocurrency associated with the purchase and prior to transferring the funds corresponding to the purchase from the omnibus account to the account associated with the merchant, a second amount of funds, where: 1) the second amount of funds corresponds to the fee, 2) removing the second amount of funds from the predefined amount of cryptocurrency results in a third amount of funds, and 3) transferring the funds corresponding to the purchase from the omnibus account to the account associated with the merchant comprises transferring the third amount of funds.

In one or more examples, the computing platform may store the association between the merchant, the client, and the one of the plurality of prefetched pay to addresses. Upon receiving, from the client, a request to make a second purchase from the merchant, the computing platform may: 1) monitor the one of the plurality of prefetched pay to addresses for receipt of a second amount of cryptocurrency associated with the second purchase, and 2) upon detecting receipt of the second amount of cryptocurrency, transfer funds corresponding to the second purchase from the omnibus account to the account associated with the merchant.

In one or more instances, the predefined amount of cryptocurrency may include at least a first amount of a first cryptocurrency and a second amount of a second cryptocurrency. In one or more instances, the computing platform may send one or more commands to a client device directing the client device to display a purchase confirmation, which may cause the client device to display the purchase confirmation. The computing platform may send one or more commands to a merchant device directing the merchant device to display a payment execution confirmation, which may cause the merchant device to display the payment execution confirmation.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 depict illustrative graphical user interfaces that implement an omnibus account for improved address generation, monetization, and autoconversion for cryptocurrency transactions in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to improved address generation, monetization, and autoconversion for custodial transactions involving cryptocurrency. For example, when an enterprise (such as a currency exchange, financial institution, or the like) serves as an intermediary between buyers and sellers in a marketplace, pay to addresses (e.g., pointing to an account of the middle man) must be generated for payments, and sometimes a new payment address for each payment transaction. In a large scale operation, addresses for customers must be generated for use in payments at a very high rate (e.g., millions per day). However, it may be impractical to create a new request to generate an address every single time a charge is issued (e.g., because, for example, in the case of blockchain addresses these requests may be computationally expensive and/or otherwise cause traffic spikes).

Accordingly, described herein is an address pool service responsible for maintaining a pool of addresses that may be allocated/used by commerce systems. The service might not monitor transactions on the addresses once they have been handed off (e.g., delegated to the consumer of the addresses themselves). Additionally, consumers may be expected to release their addresses back to the pool once they have finished with them.

Additionally, in some instances, merchants may have a preference for a particular currency (e.g., fiat) and customers may have a preference for a different currency (e.g., a digital or cryptocurrency). Accordingly, in these instances, a customer may make a purchase using a first currency, and the seller may wish to receive the payment using a second currency. In some instances, there may be delays, security concerns, and/or other inconveniences with converting the first currency to the second currency. Accordingly, described herein are systems and methods for autoconversion of the currency between the buyer and the seller, which may result in quicker transaction processing, increased transaction security, and/or improved buyer/seller experiences.

These and other features are described in further detail below.

Figure 1:
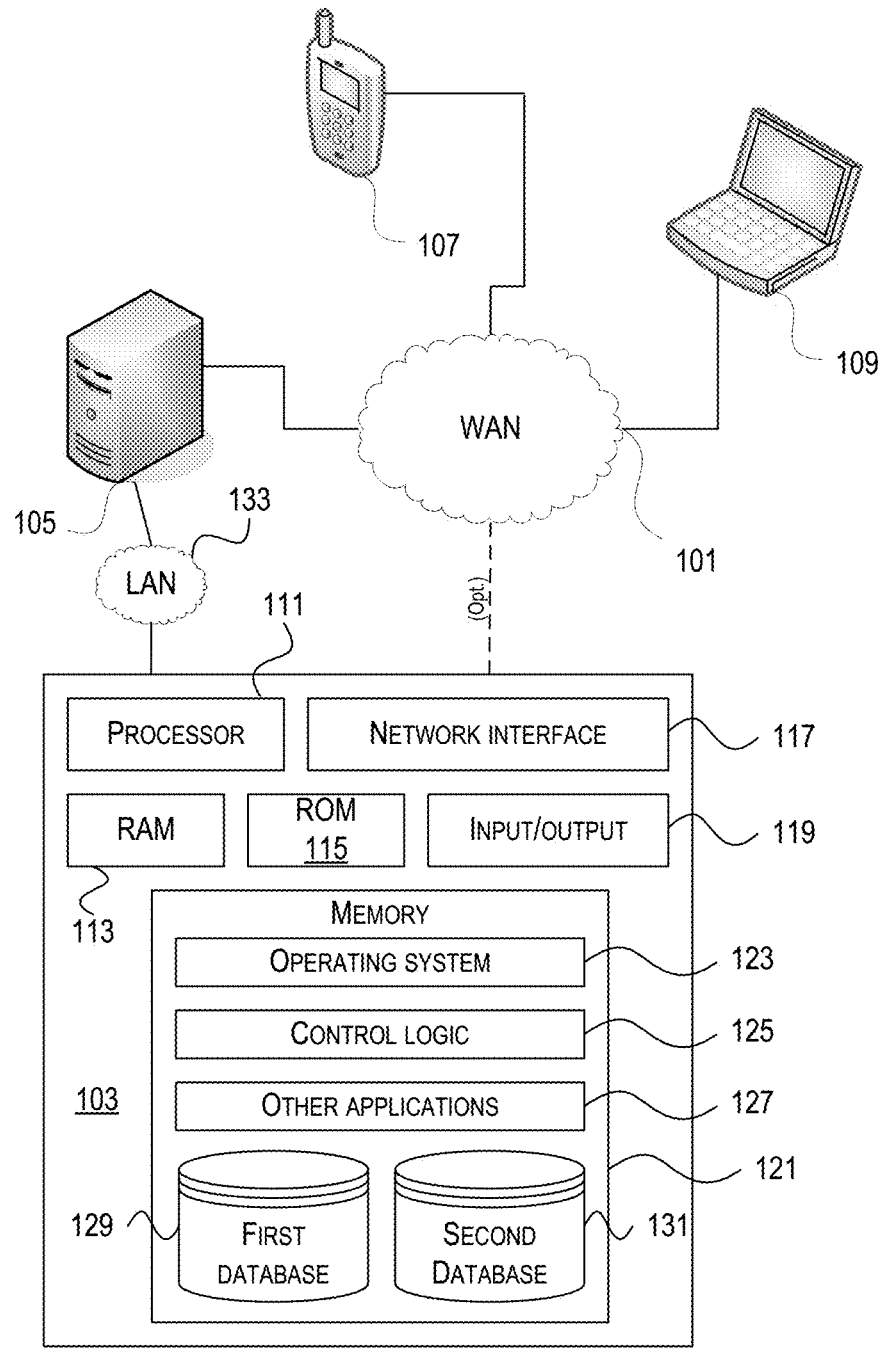
FIG. 1 depicts an illustrative computing environment that implements an omnibus account for improved address generation, monetization, and autoconversion for cryptocurrency transactions in accordance with one or more example embodiments.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

FIGS. 2A-2E depict an illustrative event sequence for performing improved address generation, monetization, and autoconversion in custodial transactions involving cryptocurrency in accordance with one or more example embodiments. It should be understood that these figures may depict a group of steps that may be performed in the order as shown in FIGS. 2A-2E (e.g., step 206 shown in FIG. 2B may occur in sequence after step 205 shown in FIG. 2A). This sequence is merely illustrative however, and these steps may be performed in other orders/combinations without departing from the scope of the disclosure.

Figure 2A:
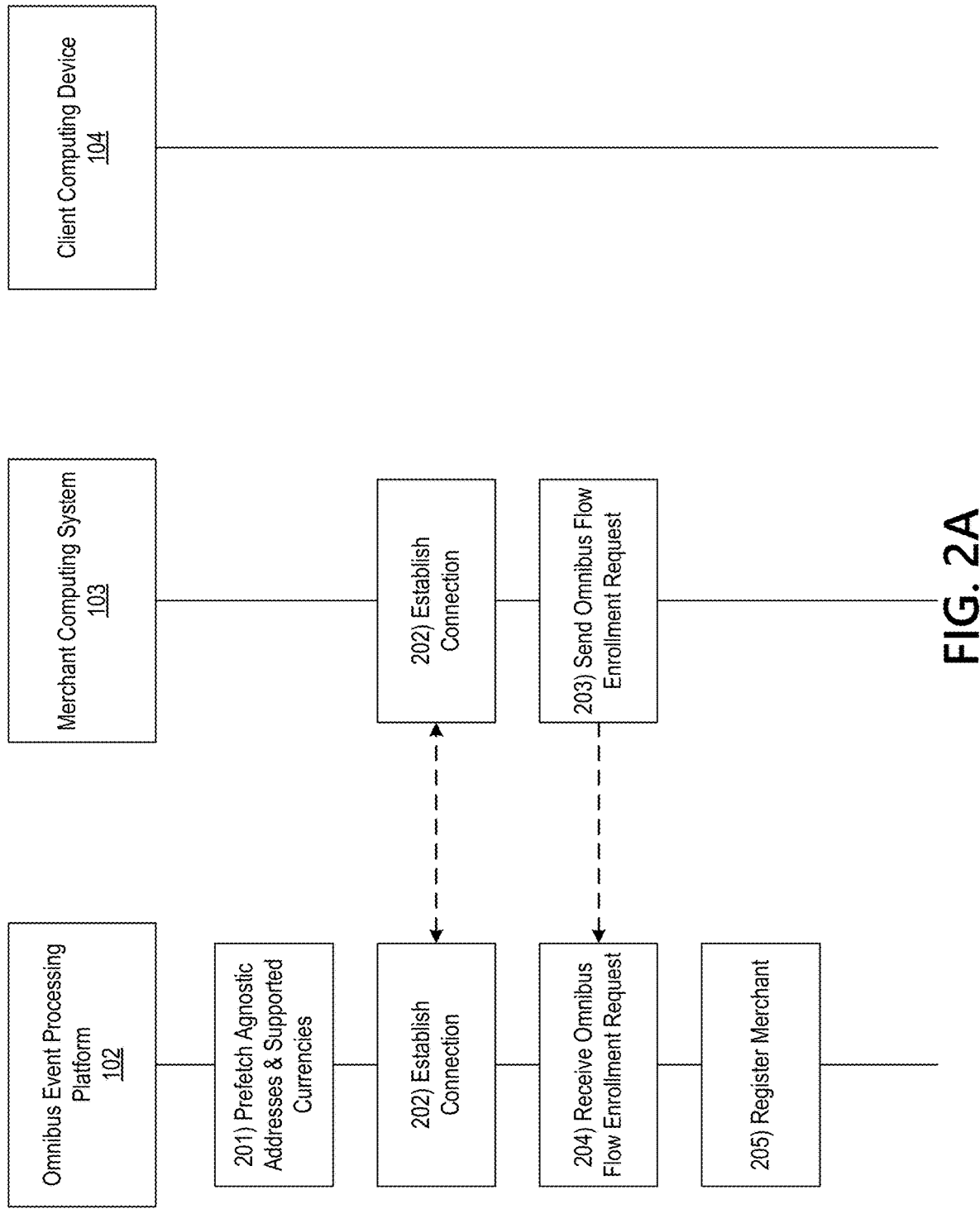
FIGS. 2A-2E depict an illustrative event sequence that implements an omnibus account for improved address generation, monetization, and autoconversion for cryptocurrency transactions with one or more example embodiments.

Referring to FIG. 2A, at step 201, an omnibus event processing platform 102 (which may be, for example, the data server 103 as illustrated in FIG. 1) may prefetch a plurality of addresses (e.g., "pay to" addresses associated with an omnibus account at the omnibus event processing platform 102 that may be used to route funds from the omnibus account to a merchant account, though might not be associated with a particular merchant account at the time they are prefetched). For example, in a conventional check out processes, a pay to address may be generated when an individual checks out with a basket of goods in a marketplace. In these examples, a public key for the merchant may be used to generate such addresses. Where a large number of merchants are involved, address generation may implement significant processing resources and/or other effort (e.g., due to the significant security implementations around access to keys for users), especially in the use case of custodial products/services (e.g., sales in which money is transferred through a third party (such as a currency exchange) between the seller and the buyer). In these instances, there may be additional structure or security measures imposed by the third party that may complicate or otherwise delay the address generation process. Accordingly, it may be time consuming to generate such addresses, resulting in delays in payment processing.

To remedy this delay, the omnibus event processing platform 102 may prefetch (e.g., generate in advance), a plurality of addresses prior to receipt of an event processing request (e.g., a purchase request, payment request, and/or other request). In doing so, rather than generating an address specifically for a particular merchant, the omnibus event processing platform 102 may generate addresses that are account agnostic, and may be used by any of a plurality of merchants on an as needed basis. In prefetching the addresses, the omnibus event processing platform 102 may generate a plurality of addresses that may be used to identify merchants, and that are associated with (e.g., feed into) an omnibus account hosted by the omnibus event processing platform 102. In some instances, in prefetching the addresses, the omnibus event processing platform 102 may generate a plurality of addresses, each corresponding to a particular currency. For example, if a particular merchant wants to accept payment in Ethereum, Bitcoin, and USDC, three addresses may be prefetched (e.g., one for each currency).

At step 201, in some instances, the omnibus event processing platform 102 may prefetch currencies supported by an enterprise organization corresponding to the omnibus event processing platform 102 (e.g., the currencies for which addresses are prefetched as described above). For example, the omnibus event processing platform 102 may prefetch various amounts of one or more cryptocurrencies, fiat, and/or other currencies. In doing so, the omnibus event processing platform 102 may make funds available to trade and/or otherwise disburse to merchants (e.g., in the event that an autoconversion is requested) so as to reduce delay and/or other wait times associated with the conversion. In some instances, the omnibus event processing platform 102 may store this prefetched currency in an omnibus account corresponding to the enterprise organization (which may e.g., be hosted by the omnibus event processing platform 102, or other system affiliated with a currency exchange, financial institution, or the like).

At step 202, a merchant computing system 103 (which may be, for example, one or more of devices 105, 107, and/or 109 as illustrated in FIG. 1) may establish a connection with the omnibus event processing platform 102. For example, the merchant computing system 103 may establish a first data connection with the omnibus event processing platform 102 to link the merchant computing system 103 to the omnibus event processing platform 102 (e.g., in preparation for sending an enrollment request to the omnibus event processing platform 102). In some instances, the merchant computing system 103 may identify whether or not a connection is already established with the omnibus event processing platform 102. If a connection is already established, the merchant computing system 103 might not re-establish the connection. If a connection is not yet established, the merchant computing system 103 may establish the first data connection as described herein.

At step 203, the merchant computing system 103 may send an omnibus flow enrollment request to the omnibus event processing platform 102. For example, the merchant computing system 103 may send the omnibus flow enrollment request to the omnibus event processing platform 102 while the first data connection is established. In doing so, the merchant computing system 103 may send a request to enroll in the omnibus account service hosted by the omnibus event processing platform 102 that may enable transaction processing by the omnibus event processing platform 102 on behalf of a merchant affiliated with the merchant computing system 103 and clients of the merchant. In some instances, in sending the omnibus flow enrollment request, the merchant computing system 103 may send details about the merchant (e.g., account information, currency preferences, and/or other information).

At step 204, the omnibus event processing platform 102 may receive the omnibus flow enrollment request sent at step 203. For example, the omnibus event processing platform 102 may receive the omnibus flow enrollment request via the communication interface 113 and while the first data connection is established.

At step 205, the omnibus event processing platform 102 may register the merchant in response to the omnibus flow enrollment request. In doing so, the omnibus event processing platform 102 may store account information for the merchant and any preferences associated with the merchant (e.g., should monetization be performed, should autoconversion be performed and, if so, to what currency).

Figure 2B:
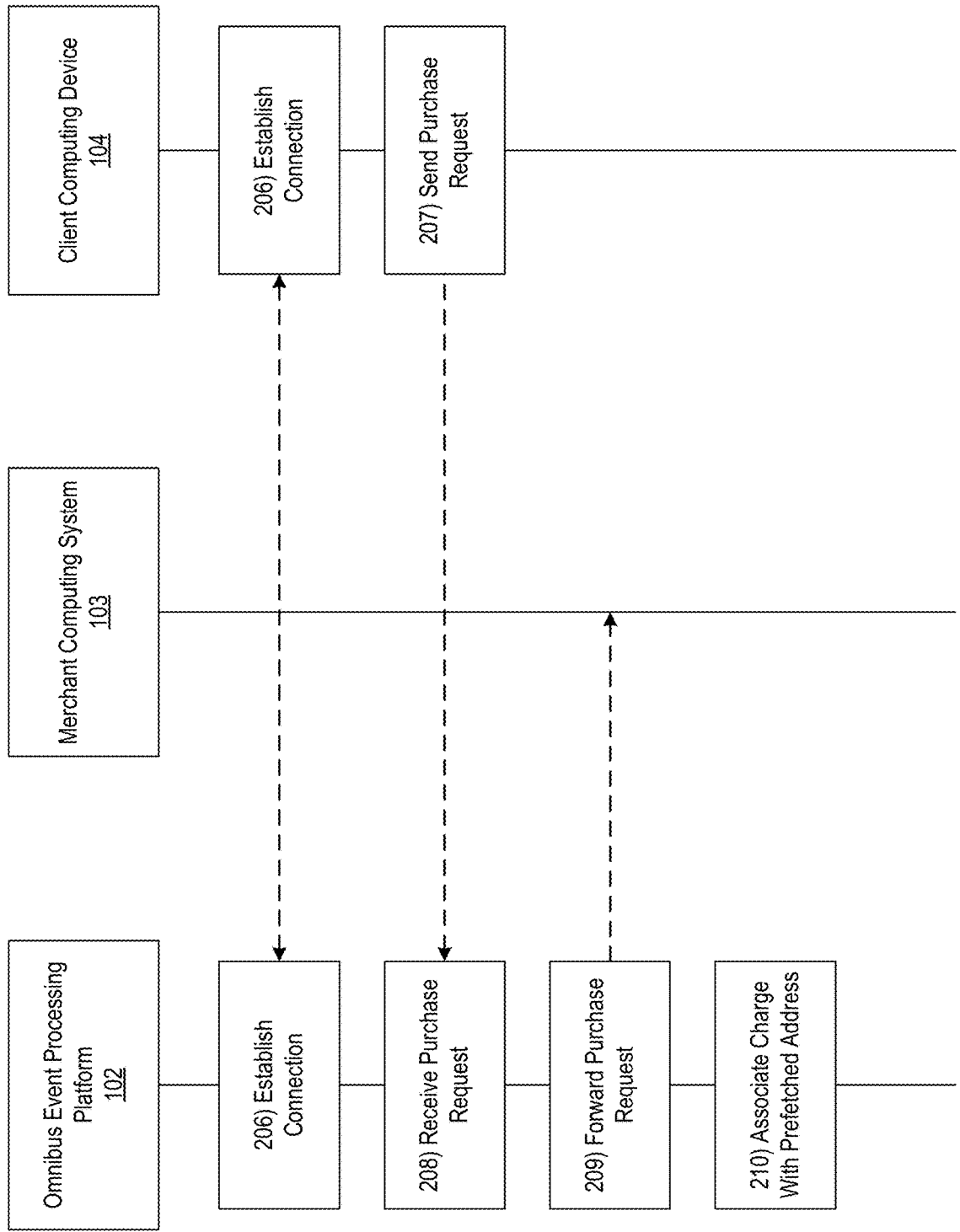

Referring to FIG. 2B, at step 206, a client computing device 104 (which may be, for example, one or more of devices 105, 107, and/or 109 as illustrated in FIG. 1) may establish a connection with the omnibus event processing platform 102. For example, the client computing device 104 may establish a second data connection to the omnibus event processing platform 102 to link the client computing device 104 to the omnibus event processing platform 102 (e.g., in preparation for sending a purchase request). In some instances, the client computing device 104 may identify whether or not a connection is already established with the omnibus event processing platform 102. If a connection is already established with the omnibus event processing platform 102, the client computing device 104 might not re-establish the connection. If a connection is not yet established with the omnibus event processing platform 102, the client computing device 104 may establish the second data connection as described herein.

At step 207 the client computing device 104 may send a purchase request to the omnibus event processing platform 102. For example, the client computing device 104 may send the purchase request to the omnibus event processing platform 102 while the second data connection is established. In some instances, the client computing device 104 may send a request to purchase an item or service from the merchant.

At step 208, the omnibus event processing platform 102 may receive the purchase request sent at step 207. For example, the client computing device 104 may receive the purchase request via the communication interface 113 and while the second data connection is established.

At step 209, the omnibus event processing platform 102 may forward the purchase request to the merchant computing system 103. For example, the omnibus event processing platform 102 may forward the purchase request to the merchant computing system 103 via the communication interface 113 and while the first data connection is established. In some instances, rather than sending the purchase request to the omnibus event processing platform 102 and then forwarding the request to the merchant computing system 103, the client computing device 104 may send the purchase request to the merchant computing system 103, and the omnibus event processing platform 102 may be otherwise notified of the purchase request.

In other instances, rather than sending the purchase request to the omnibus event processing platform 102 directly, which may then forward the request to the merchant computing system 103 (e.g., as described/illustrated in steps 207-209), the client computing device 104 may send the purchase request to the merchant computing system 103. In these instances, the merchant computing system 103 may then call the omnibus event processing platform 102 to create a charge once the purchase request is received (e.g., as described below at step 210).

At step 210, the omnibus event processing platform 102 may associate a charge (e.g., for the purchase request) with one of the prefetched addresses generated at step 201. For example, upon receiving the purchase request, the omnibus event processing platform 102 may assign one of the addresses to the corresponding merchant. By already having the address generated (e.g., in advance/prefetched), the omnibus event processing platform 102 may reduce delay corresponding to execution of a sale/payment (e.g., because delays associated with address generation, when performed in response to receiving the purchase request, may be avoided).

Figure 2C:
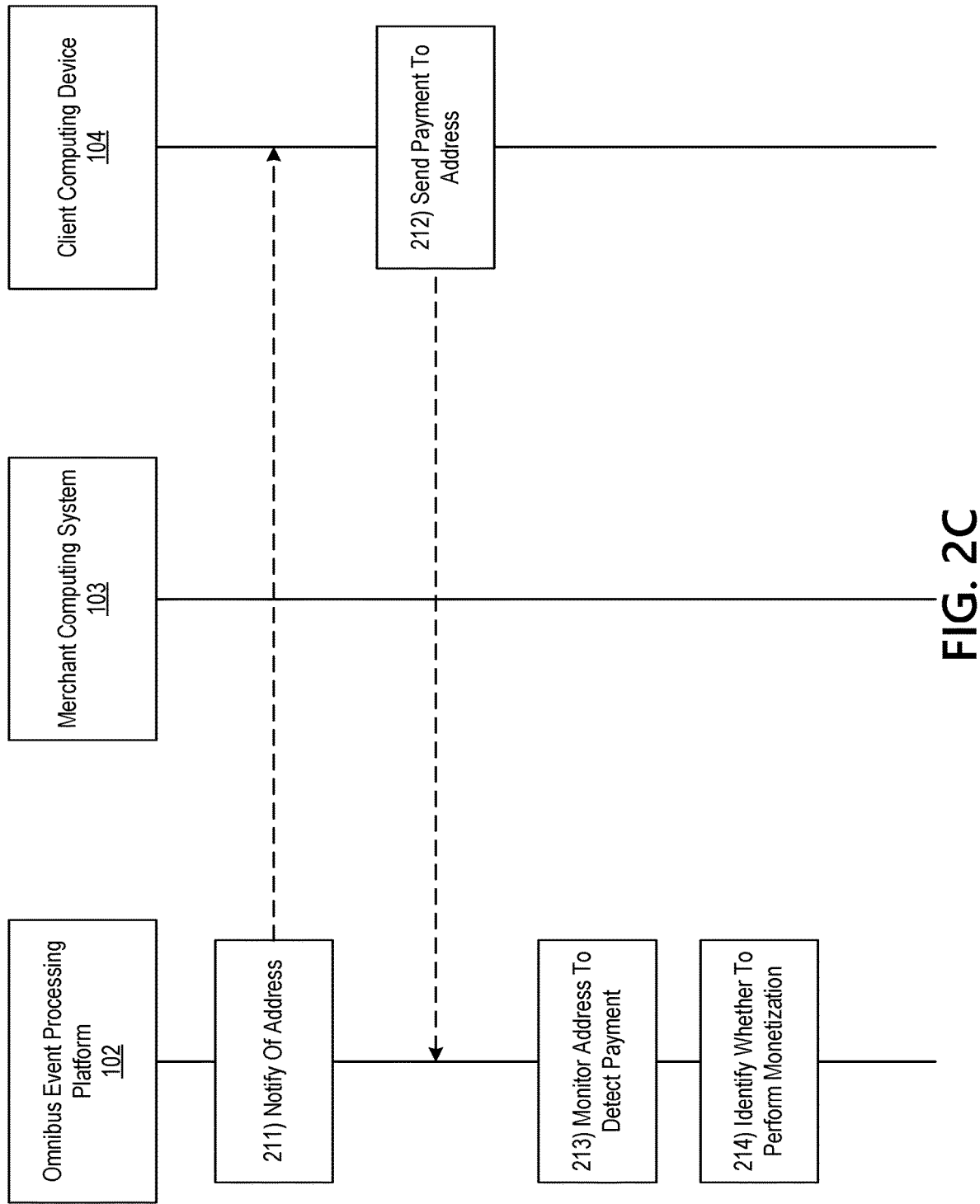

Referring to FIG. 2C, at step 211, the omnibus event processing platform 102 may notify the client computing device 104 of the address selected at step 210 (or otherwise enable the client/customer to deposit and/or cause a transfer of funds to the address). In some instances, the omnibus event processing platform 102 may notify the client computing device 104 of the address via the communication interface 113 and while the second data connection is established.

At step 212, the client computing device 104 may send a payment (e.g., corresponding to the purchase) to the address (which may e.g., cause the payment to be shifted from an account of the client/customer into the omnibus account hosted by the omnibus event processing platform 102). In some instances, in sending the payment, the client computing device 104 may cause a transfer of one or more cryptocurrencies (which may, in some instances, include a first amount of a first cryptocurrency, a second amount of a second cryptocurrency, or the like), one or more types of fiat currency, or a combination of the two.

At step 213, the omnibus event processing platform 102 may monitor the address to detect execution of the payment. For example, the omnibus event processing platform 102 may monitor the address to detect full or partial payment of funds to satisfy the purchase. If a partial payment is detected, the omnibus event processing platform 102 may continue to monitor the address to detect full payment. If full payment is detected, the omnibus event processing platform 102 may proceed to step 214. As funds are received at the address, they may be routed to the omnibus account hosted by the omnibus event processing platform 102. In some instances, in detecting execution of the payment, the omnibus event processing platform 102 may detect that an amount of one or more cryptocurrencies and/or fiat currencies were transferred from an account of the customer/client to the omnibus account.

In some instances, once a payment is detected, the omnibus event processing platform 102 may send event processing information to the merchant computing system 103 and/or the client computing device 103 (e.g., indicating that a payment has been received). In some instances, the omnibus event processing platform 102 may also send one or more commands directing the merchant computing system 103 and/or the client computing device 103 to display the event processing information.

In some instances, the omnibus event processing platform 102 may maintain specific know your customer (KYC) rules, which may e.g., be provided by merchants. In these instances, once payment is detected, the omnibus event processing platform 102 may compare payments or other transaction parameters to the rules, and may accept/reject transactions accordingly. In instances where transactions are rejected, the omnibus event processing platform 102 may refund the client/customer without further merchant intervention.

At step 214, the omnibus event processing platform 102 may identify whether to perform monetization. Simply put, the omnibus event processing platform 102 may identify whether a fee should be paid to the intermediary from the funds transferred to the omnibus account. For example, the omnibus event processing platform 102 may identify whether or not a portion of the funds transferred to the omnibus account (e.g., via the address) should be retained by the enterprise managing the omnibus event processing platform 102 (e.g., a service fee retained by a currency exchange, financial institution, or the like). In some instances, the omnibus event processing platform 102 may identify whether to perform monetization based on information stored about the merchant during the enrollment process (e.g., what types of services are being performed, a contract between the merchant and the enterprise, or the like). If monetization is not to be performed, the omnibus event processing platform 102 may proceed to step 216. If monetization is to be performed, the omnibus event processing platform 102 may proceed to step 215.

Figure 2D:
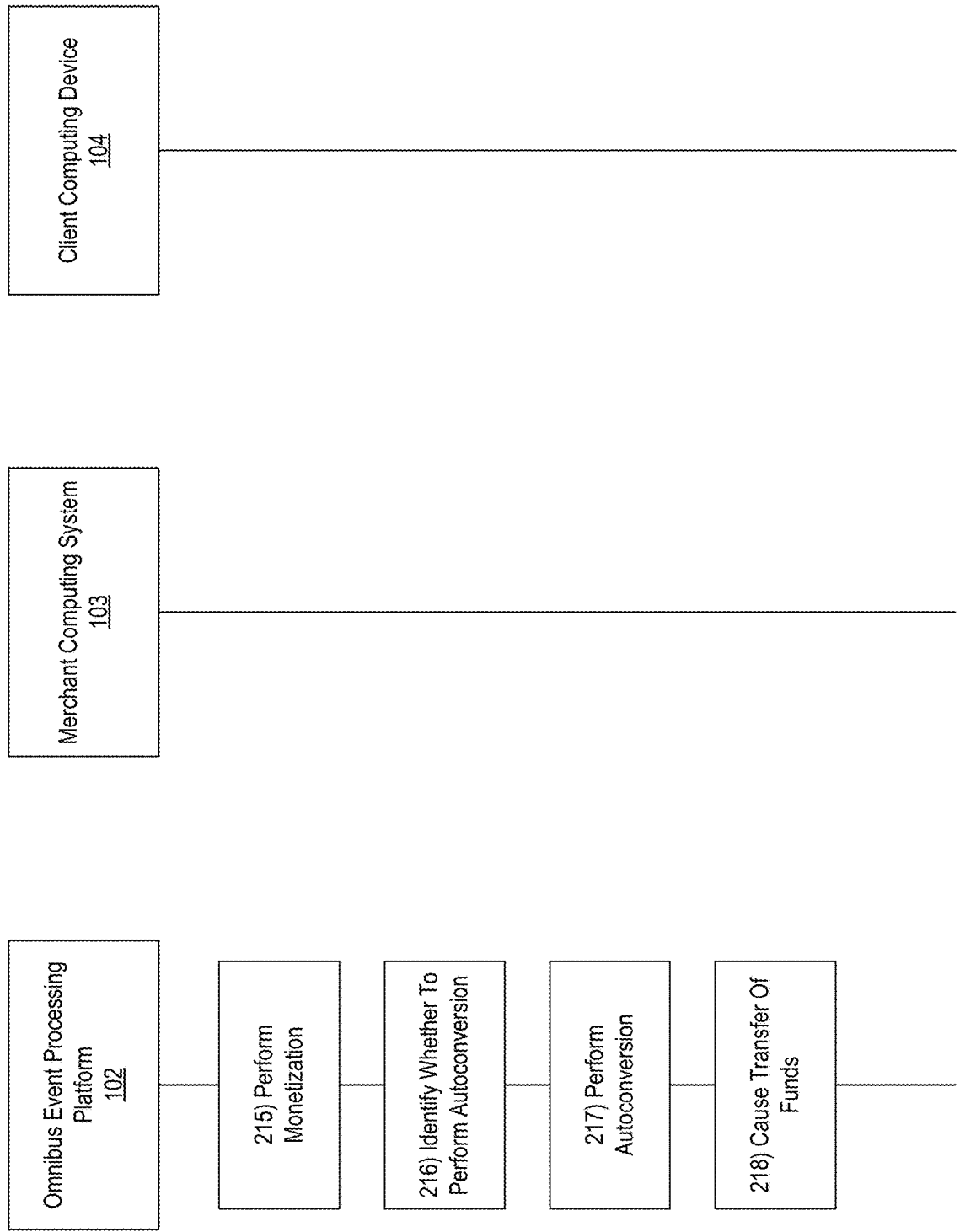

Referring to FIG. 2D, at step 215, the omnibus event processing platform 102 may perform the monetization. For example, the omnibus event processing platform 102 may remove a portion (e.g., 1%, or the like) of the paid funds and store them, for example, in a different account and/or a portion of the omnibus account that is not used for payments to merchants (or simply otherwise remove the portion of the funds and store it elsewhere prior to forwarding the remaining funds to the merchant). By capturing this portion of the funds prior to transferring the funds to the merchant account, the omnibus event processing platform 102 may avoid circumstances in which the enterprise must chase down fees from a merchant and/or otherwise experiences difficulty in recouping fees because the enterprise does not have direct access to the merchant's account. Such fee arrangements may vary, and may be controlled by a contract between the merchant and the payment processor.

At step 216, the omnibus event processing platform 102 may identify whether or not to perform autoconversion. For example, the omnibus event processing platform 102 may identify whether or not the funds received from the customer are of a sufficient type to satisfy payment to the merchant (e.g., based on merchant preferences, or the like, which may have been identified during the enrollment process). For example, the customer may execute a payment using a cryptocurrency, whereas the merchant may wish to receive payment using fiat currency. In these examples, autoconversion of the cryptocurrency to fiat currency should be performed prior to transferring the funds to the merchant's account. If the omnibus event processing platform identifies that autoconversion should not be performed, it may proceed to step 218. If the omnibus event processing platform 102 identifies that autoconversion should be performed, it may proceed to step 217.

At step 217, the omnibus event processing platform 102 may perform the autoconversion within a predetermined time duration (e.g., at substantially the same time as the funds are received). For example, the omnibus event processing platform 102 may identify an exchange rate between the provided currency and the target currency, and may select an amount of the target currency to be transferred to the merchant's account. In some instances, to obtain the target currency, the omnibus event processing platform 102 may execute one or more trades to obtain the target currency in exchange for the provided currency. In these instances, there may be processing delays corresponding to the conversion due to the time needed to execute the trades. Accordingly, the currency prefetched at step 201 may be used to execute the payment to the merchant in the meantime. For example, a comparable amount of the target currency may be determined (e.g., based on an exchange rate), and that amount of the target currency may be selected for transfer to the merchants account. In the meantime, the omnibus event processing platform 102 may execute or otherwise coordinate trades to exchange the provided currency for the target currency, and replenish the supply of prefetched currency once the target currency has been received. In some instances, this replenishing may occur after the funds have already been provided to the merchant (or simultaneously). p By executing the payment using these prefetched funds, the omnibus event processing platform 102 may reduce volatility for merchants. For example, if a delay was experienced (e.g., to process all of the trades) prior to moving the funds into the merchant's account, exchange rates may change during the delay, which may result in the merchant receiving a lesser amount of the target currency than if the funds had been transferred at substantially the same time as they were received from the customer. For example, the value of a particular cryptocurrency received from the customer may decrease over time. Accordingly, by enabling such payment at substantially the same time (e.g., using the prefetched funds), the omnibus event processing platform 102 may ensure that the payment received by the merchant is as accurate as possible, and that merchants do not experience volatility in the payments received.

Additionally, in executing the trades, the omnibus event processing platform 102 may trade using credentials for the omnibus account without otherwise needed credentials for or accessing the merchant's accounts. In doing so, the omnibus event processing platform 102 may reduce security concerns associated with enabling the enterprise (of the omnibus event processing platform 102) to trade on behalf of merchants using the merchant's credentials.

At step 218, the omnibus event processing platform 102 may cause a transfer of the funds from the omnibus account to the merchant's account. For example, based on the association of the merchant and their account during the enrollment process, the omnibus event processing platform 102 may identify the merchant's account, and transfer the funds accordingly. In some instances, in transferring the funds to the merchant, the omnibus event processing platform 102 may transfer a subset of the funds received from the customer, which may, e.g., be the amount of funds received from the customer minus the fee removed through monetization. Additionally or alternatively, in transferring the funds to the merchant, the omnibus event processing platform 102 may transfer a different type of funds than were received from the customer (e.g., based on the autoconversion). For example, the omnibus event processing platform 102 may transfer fiat currency to the merchant even through a cryptocurrency was used by the customer to make the payment.

Figure 2E:
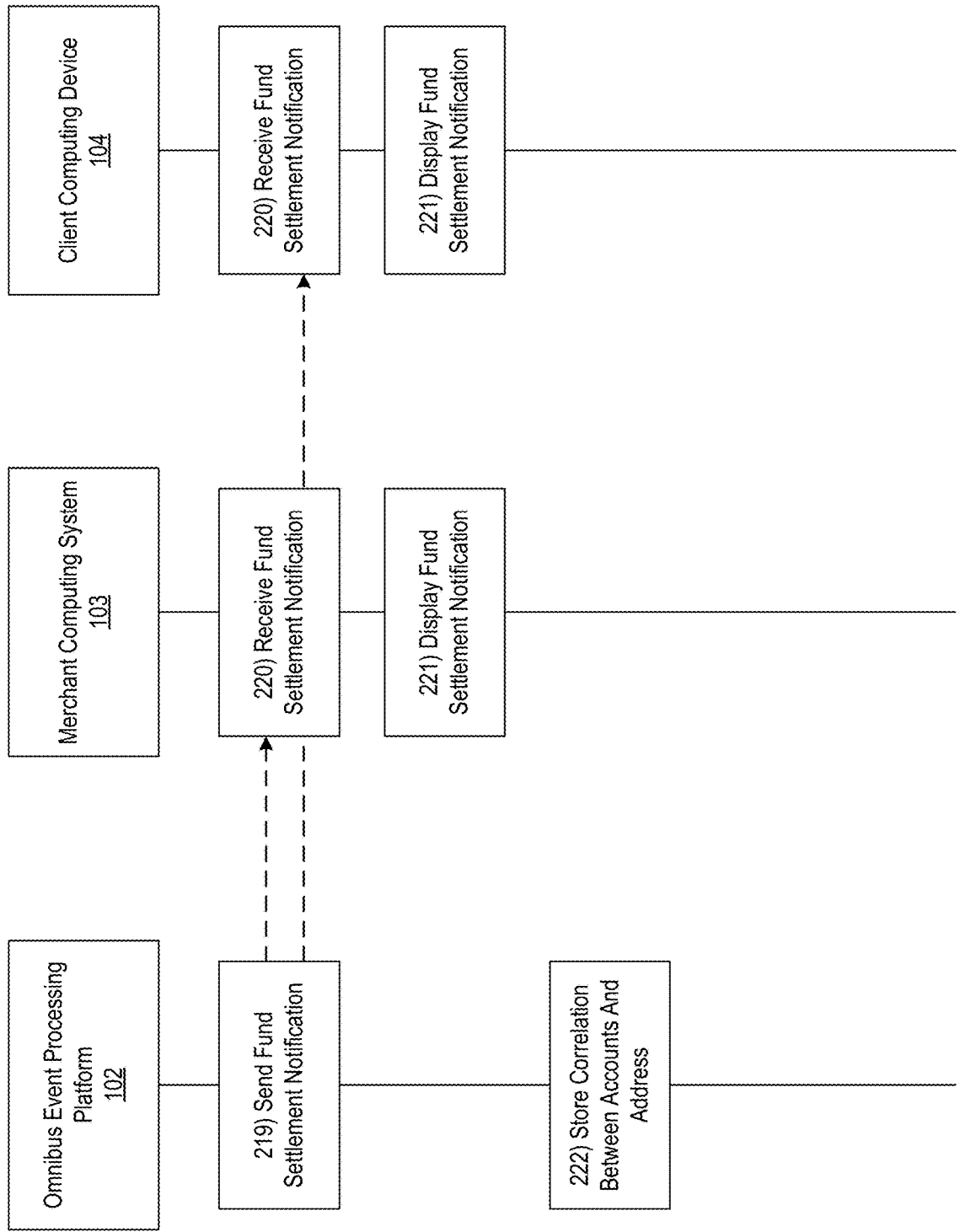

Referring to FIG. 2E, at step 219, the omnibus event processing platform 102 may send a funds settlement notification to the merchant computing system 103 and/or the client computing device 104 (e.g., confirming settlement of the final funds). In some instances, the omnibus event processing platform 102 may send the funds settlement notification via the communication interface 113 and while the first and/or second data connections are established. In some instances, the omnibus event processing platform 102 may send one or more commands directing the merchant computing system 103 and/or the client computing device 104 to display the funds settlement notification.

At step 220, the merchant computing system 103 and/or the client computing device 104 may receive the funds settlement notification. For example, the merchant computing system 103 and/or the client computing device 104 may receive the funds settlement notification while the first and/or second data connection is established. In some instances, the merchant computing system 103 and/or the client computing device 104 may receive the one or more commands directing the merchant computing system 103 and/or the client computing device 104 to display the funds settlement notification.

At step 221, based on or in response to the one or more commands directing the merchant computing system 103 and/or the client computing device 104 to display the event processing confirmation, the merchant computing system 103 and/or the client computing device 104 may display the funds settlement notification. For example, the client computing device 104 may display a final purchase confirmation similar to graphical user interface 405, which is shown in FIG. 4. The merchant computing system 103 may display a final payment confirmation similar to graphical user interface 505, which is shown in FIG. 5.

At step 222, the omnibus event processing platform 102 may store a correlation between the merchant, the customer, and the address so as to enable subsequent transactions between the merchant and the customer using the address. For example, if a second purchase request is received from the customer, the stored address may be identified and monitored to identify completion of a corresponding payment. Then once the payment is detected, funds may be transferred from the omnibus account to the merchant's account identified in the correlation.

In other instances, the omnibus event processing platform 102 might not store a correlation with the address, and may instead return the address to the pool of prefetched addresses for use in a subsequent transaction (which may, e.g., involve different merchants and/or customers).

Although the above described event sequence primarily refers to the implementation of the described system and methods with regard to custodial transactions, these systems and methods may be implemented/leveraged for non-custodial merchant wallets without departing from the scope of the disclosure. For example, customers/clients may provide payment to an omnibus/intermediary account (e.g., such as the service hosted by omnibus event processing platform 102), which may then perform an on-chain send to self-custodied merchant accounts when appropriate (e.g., when gas/fees are low).

Figure 3:
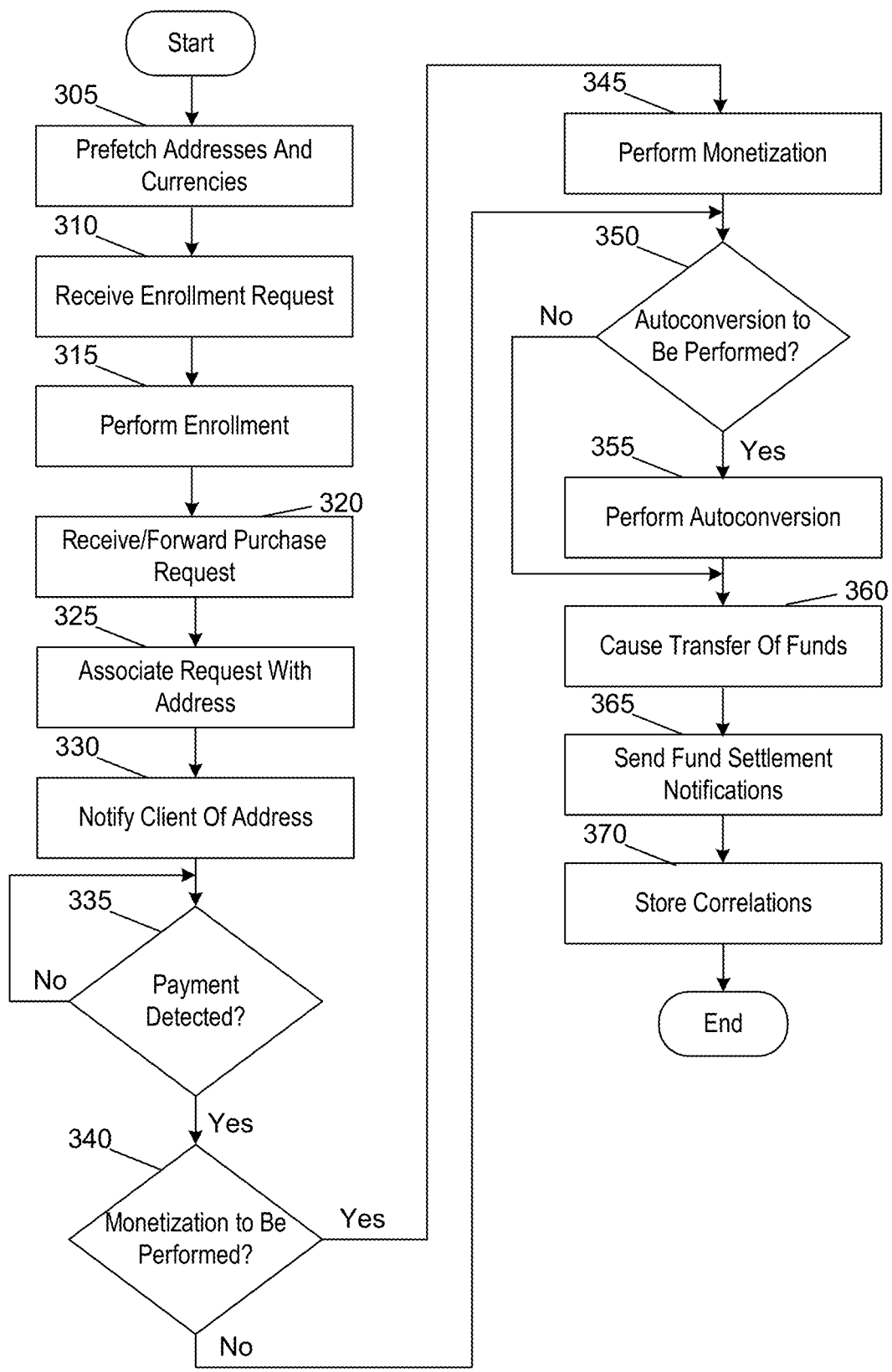
FIG. 3 depicts an illustrative method that implements an omnibus account for improved address generation, monetization, and autoconversion for cryptocurrency transactions in accordance with one or more example embodiments.

FIG. 3 depicts an illustrative method for performing improved address generation, monetization, and autoconversion in custodial transactions involving cryptocurrency in accordance with one or more example embodiments. For example, FIG. 3 depicts a summary flowchart indicating the actions performed by the omnibus event processing platform 102, which are illustrated in FIGS. 2A-2E. Referring to FIG. 3, at step 305, a computing platform having at least one processor, a communication interface, and memory may prefetch pay to addresses and currencies. At step 310, the computing platform may receive an enrollment request from a merchant. At step 315, the computing platform may enroll the merchant in an omnibus event processing service. At step 320, the computing platform may receive and/or forward a purchase request from a customer. At step 325, the computing platform may associate the request with one of the prefetched addresses. At step 330, the computing platform may notify the customer of the address. At step 335, the computing platform may identify whether or not a payment is detected. If not, the computing platform may wait until a payment is detected. If so, the computing platform may proceed to step 340.

At step 340, the computing platform may identify whether monetization is to be performed. If not, the computing platform may proceed to step 350. If so, the computing platform may proceed to step 345.

At step 345, the computing platform may perform monetization. At step 350, the computing platform may identify whether autoconversion is to be performed. If so, the computing platform may proceed to step 355. If not, the computing platform may proceed to step 360.

At step 355, the computing platform may perform the autoconversion. At step 360, the computing platform may cause a transfer of funds to the merchant. At step 365, the computing platform may send fund settlement notifications to the merchant and/or the customer. At step 370, the computing platform may store a correlation between the merchant, the customer, and the address.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method for reducing processing delays at an intermediary system between a client and a merchant, the method comprising:

at a computing platform comprising at least one processor, a communication interface, and memory:
prefetching, prior to receipt of a purchase request, a plurality of pay to addresses that are associated with an omnibus account and usable to route funds from the omnibus account to a merchant account, wherein the pay to addresses are not associated with a particular merchant account at the time they are prefetched;
receiving, from the client, a request to make a purchase for a purchase amount from the merchant using cryptocurrency;
associating the client and the merchant with one of the plurality of prefetched pay to addresses;
notifying, directly by the computing platform, the client of the one of the plurality of prefetched pay to addresses;
monitoring the one of the plurality of prefetched pay to addresses for receipt of a predefined amount of cryptocurrency associated with the purchase;
upon detecting receipt of the predefined amount of cryptocurrency, autoconverting the amount of cryptocurrency to an equivalent amount of fiat currency at substantially the same time as the cryptocurrency is received and transferring fiat currency corresponding to the purchase amount from the omnibus account to an account associated with the merchant; and,
removing, after transferring the fiat currency corresponding to the purchase amount from the omnibus account to the account associated with the merchant, the association between the client, the merchant, and the one of the plurality of prefetched pay to addresses, wherein the one of the plurality of prefetched pay to addresses is configured for use in conducting a subsequent purchase request.

2. The method of claim 1, further comprising: enrolling the merchant in an omnibus event processing service corresponding to the omnibus account, wherein enrolling the merchant comprises identifying whether or not autoconversion should be performed for the merchant.

3. The method of claim 1, wherein autoconverting the cryptocurrency further comprises:
trading, on behalf of the omnibus account, the predefined amount of cryptocurrency for the equivalent amount of the fiat currency, wherein trading the predefined amount of cryptocurrency for the equivalent amount of the fiat currency does not involve credentials for the account associated with the merchant; and
replenishing an amount of stored fiat currency using the equivalent amount of the fiat currency.

4. The method of claim 2, wherein enrolling the merchant in the omnibus event processing service further comprises identifying whether or not a fee should be collected from the merchant on behalf of an enterprise organization affiliated with the computing platform.

5. The method of claim 4, further comprising:
based on identifying that the fee should be collected from the merchant:
removing, from the predefined amount of cryptocurrency associated with the purchase and prior to transferring the funds corresponding to the purchase from the omnibus account to the account associated with the merchant, a second amount of funds, wherein:
the second amount of funds corresponds to the fee,
removing the second amount of funds from the predefined amount of cryptocurrency results in a third amount of funds, and
transferring the funds corresponding to the purchase from the omnibus account to the account associated with the merchant comprises transferring the third amount of funds.

6. The method of claim 1, further comprising:
storing the association between the merchant, the client, and the one of the plurality of prefetched pay to addresses;
upon receiving, from the client, a request to make a second purchase from the merchant: monitoring the one of the plurality of prefetched pay to addresses for receipt of a second amount of cryptocurrency associated with the second purchase, and
upon detecting receipt of the second amount of cryptocurrency, transferring funds corresponding to the second purchase from the omnibus account to the account associated with the merchant.

7. The method of claim 1, wherein the predefined amount of cryptocurrency comprises at least a first amount of a first cryptocurrency and a second amount of a second cryptocurrency.

8. The method of claim 1, further comprising:
sending one or more commands to a client device directing the client device to display a purchase confirmation, wherein sending the one or more commands directing the client device to display the purchase confirmation causes the client device to display the purchase confirmation; and
sending one or more commands to a merchant device directing the merchant device to display a payment execution confirmation, wherein sending the one or more commands directing the merchant device to display the payment execution confirmation causes the merchant device to display the payment execution confirmation.

9. A system for reducing processing delays at an intermediary system between a client and a merchant, the system comprising:
at least one processor;
a communication interface communicatively coupled to the at least one processor; and
memory storing computer-readable instructions that, when executed by the at least one processor, cause the system to:
prefetch, prior to receipt of a purchase request, a plurality of pay to addresses that are associated with an omnibus account and usable to route funds from the omnibus account to a merchant account, wherein the pay to addresses are not associated with a particular merchant account at the time they are prefetched;
receive, from the client, a request to make a purchase for a purchase amount from the merchant using cryptocurrency;
associate the client and the merchant with one of the plurality of prefetched pay to addresses;
notify, directly by the system, the client of the one of the plurality of prefetched pay to addresses;
monitor the one of the plurality of prefetched pay to addresses for receipt of a predefined amount of cryptocurrency associated with the purchase;
upon detecting receipt of the predefined amount of cryptocurrency, autoconvert the amount of cryptocurrency to an equivalent amount of fiat currency at substantially the same time as the cryptocurrency is received and transfer fiat currency corresponding to the purchase amount from the omnibus account to an account associated with the merchant; and,
remove, after transferring the fiat currency corresponding to the purchase amount from the omnibus account to the account associated with the merchant, the association between the client, the merchant, and the one of the plurality of prefetched pay to addresses, wherein the one of the plurality of prefetched pay to addresses is configured for use in conducting a subsequent purchase request.

10. The system of claim 9, wherein the memory stores additional computer-readable instructions that, when executed by the at least one processor, cause the system to:
enroll the merchant in an omnibus event processing service corresponding to the omnibus account, wherein enrolling the merchant comprises identifying whether or not autoconversion should be performed for the merchant.

11. The system of claim 9, wherein autoconverting the cryptocurrency further comprises:
trading, on behalf of the omnibus account, the predefined amount of cryptocurrency for the equivalent amount of the fiat currency, wherein trading the predefined amount of cryptocurrency for the equivalent amount of the fiat currency does not involve credentials for the account associated with the merchant; and
replenishing an amount of stored fiat currency using the equivalent amount of the fiat currency.

12. The system of claim 10, wherein enrolling the merchant in the omnibus event processing service further comprises identifying whether or not a fee should be collected from the merchant on behalf of an enterprise organization affiliated with the system.

13. The system of claim 12, wherein the memory stores additional computer-readable instructions that, when executed by the at least one processor, cause the system to:
based on identifying that the fee should be collected from the merchant:
remove, from the predefined amount of cryptocurrency associated with the purchase and prior to transferring the funds corresponding to the purchase from the omnibus account to the account associated with the merchant, a second amount of funds, wherein:
the second amount of funds corresponds to the fee,
removing the second amount of funds from the predefined amount of cryptocurrency results in a third amount of funds, and
transferring the funds corresponding to the purchase from the omnibus account to the account associated with the merchant comprises transferring the third amount of funds.

14. The system of claim 9, wherein the memory stores additional computer-readable instructions that, when executed by the at least one processor, cause the system to:
store the association between the merchant, the client, and the one of the plurality of prefetched pay to addresses; and
upon receiving, from the client, a request to make a second purchase from the merchant:
monitor the one of the plurality of prefetched pay to addresses for receipt of a second amount of cryptocurrency associated with the second purchase, and
upon detecting receipt of the second amount of cryptocurrency, transfer funds corresponding to the second purchase from the omnibus account to the account associated with the merchant.

15. The system of claim 9, wherein the predefined amount of cryptocurrency comprises at least a first amount of a first cryptocurrency and a second amount of a second cryptocurrency.

16. The system of claim 9, wherein the memory stores additional computer-readable instructions that, when executed by the at least one processor, cause the system to:
send one or more commands to a client device directing the client device to display a purchase confirmation, wherein sending the one or more commands directing the client device to display the purchase confirmation causes the client device to display the purchase confirmation; and
send one or more commands to a merchant device directing the merchant device to display a payment execution confirmation, wherein sending the one or more commands directing the merchant device to display the payment execution confirmation causes the merchant device to display the payment execution confirmation.

17. One or more non-transitory computer-readable media storing instructions that, when executed by a computing platform comprising at least one processor, a communication interface, and memory, cause the computing platform to reduce processing delays at an intermediary system between a client and a merchant by:
prefetching, prior to receipt of a purchase request, a plurality of pay to addresses that are associated with an omnibus account and usable to route funds from the omnibus account to a merchant account, wherein the pay to addresses are not associated with a particular merchant account at the time they are prefetched;
receiving, from the client, a request to make a purchase for a purchase amount from the merchant using cryptocurrency;
associating the client and the merchant with one of the plurality of prefetched pay to addresses;
notifying, directly by the computing platform, the client of the one of the plurality of prefetched pay to addresses;
monitoring the one of the plurality of prefetched pay to addresses for receipt of a predefined amount of cryptocurrency associated with the purchase;
upon detecting receipt of the predefined amount of cryptocurrency, autoconverting the amount of cryptocurrency to an equivalent amount of fiat currency at substantially the same time as the cryptocurrency is received and transferring fiat currency corresponding to the purchase amount from the omnibus account to an account associated with the merchant; and,
removing, after transferring the fiat currency corresponding to the purchase amount from the omnibus account to the account associated with the merchant, the association between the client, the merchant, and the one of the plurality of prefetched pay to addresses, wherein the one of the plurality of prefetched pay to addresses is configured for use in conducting a subsequent purchase request.

18. The one or more non-transitory computer-readable media of claim 17, wherein the memory stores additional computer-readable instructions that, when executed by the at least one processor, cause the computing platform to: enroll the merchant in an omnibus event processing service corresponding to the omnibus account, wherein enrolling the merchant comprises identifying whether or not autoconversion should be performed for the merchant.

* * * * *